(12) United States Patent
Bourqui

(10) Patent No.: US 10,424,986 B2
(45) Date of Patent: Sep. 24, 2019

(54) ACTUATOR

(71) Applicant: JOHNSON ELECTRIC INTERNATIONAL AG, Murten (CH)

(72) Inventor: Yvan Bourqui, Corminboeuf (CH)

(73) Assignee: Johnson Electric International AG, Murten (CH)

(*) Notice: Subject to any disclaimer, the term of this patent is extended or adjusted under 35 U.S.C. 154(b) by 277 days.

(21) Appl. No.: 15/357,583

(22) Filed: Nov. 21, 2016

(65) Prior Publication Data

US 2017/0149300 A1 May 25, 2017

(30) Foreign Application Priority Data

Nov. 19, 2015 (GB) .................... 1520386.2

(51) Int. Cl.
| | |
|---|---|
| *H02K 3/50* | (2006.01) |
| *H01R 12/70* | (2011.01) |
| *H01R 12/72* | (2011.01) |
| *H02K 7/116* | (2006.01) |
| *H01R 12/75* | (2011.01) |
| *H02K 5/22* | (2006.01) |
| *H02K 11/21* | (2016.01) |

(52) U.S. Cl.
CPC ........... *H02K 3/50* (2013.01); *H01R 12/7052* (2013.01); *H01R 12/721* (2013.01); *H01R 12/75* (2013.01); *H02K 5/225* (2013.01); *H02K 7/116* (2013.01); *H02K 5/22* (2013.01); *H02K 7/1163* (2013.01); *H02K 7/1166* (2013.01); *H02K 11/21* (2016.01)

(58) Field of Classification Search
CPC ....... H02K 5/22; H02K 7/1163; H02K 7/1166
USPC ........................... 310/68 R, 71, 83
See application file for complete search history.

(56) References Cited

U.S. PATENT DOCUMENTS

| | | | | |
|---|---|---|---|---|
| 7,291,951 B2 * | 11/2007 | Takiguchi | .............. | B60Q 1/076 310/67 R |
| 2011/0249362 A1 * | 10/2011 | Saichi | ................ | G11B 19/2009 360/99.08 |
| 2012/0075746 A1 * | 3/2012 | Yoneda | .............. | G11B 19/2009 360/99.08 |
| 2014/0209781 A1 * | 7/2014 | Weber | .................... | F16F 15/06 248/560 |

FOREIGN PATENT DOCUMENTS

| | | |
|---|---|---|
| CN | 101931136 A | 12/2010 |
| CN | 203039486 U | 7/2013 |

* cited by examiner

*Primary Examiner* — Gary A Nash
(74) *Attorney, Agent, or Firm* — Muncy, Geissler, Olds & Lowe, P.C.

(57) ABSTRACT

An actuator for a vehicle air-conditioning unit, has a housing, an output driven by a gear train, a motor driving the output via the gear train, a PCB connected to the motor for supplying power to the motor; and lead wires connected to the PCB via a direct connection connector to supply power to the PCB. Terminals of the connector are crimped to the lead wires and make direct mechanical contact with contact pads formed on the PCB.

11 Claims, 5 Drawing Sheets

ACTUATOR

CROSS REFERENCE TO RELATED APPLICATIONS

This non-provisional patent application claims priority under 35 U.S.C. § 119(a) from Patent Application No. 1520386.2 filed in Britain on 19 Nov. 2015.

FIELD OF THE INVENTION

This invention relates to actuators and in particular, to an actuator for a vehicle air-conditioning unit having supply leads directly connected to a control board or PCB of the actuator.

BACKGROUND OF THE INVENTION

A vehicle air-conditioning unit has flaps arranged to control the flow of air through the unit. These flaps are controlled by one or more actuators. Each actuator has an internal control board or PCB having components relating to the control and operation of the actuator. The PCB is connected to a communication bus and to a power supply by lead wires in a traditional plug and socket arrangement with a connector socket being mounted to an opening in the actuator housing and connected to the PCB by solder pins, as shown in the diagrammatic prior art actuator shown in FIG. 5. The prior art actuator 50, has a connector socket 51 with pins 52 soldered to the PCB of the actuator and fitted to a special extension of a housing of the actuator.

This leads to two problems. The size and weight of the connector socket is significant and requires a precise opening in the housing for mounting of the socket with sufficient strength to support the socket and the forces applied to the housing in attached and detaching the supply leads to the socket.

A second problem is the use of solder which is now a regulated material and also has issued with respect to failure modes due to the known dangerous of incorrect soldering conditions leading to 'dry' joints, open circuits and solder contamination. Solder also has aging issues especially when subjected to vibration, as when used in a vehicle.

Hence there is a desire for an improved actuator which avoids the use of a soldered connection socket.

SUMMARY OF THE INVENTION

This is achieved in the present invention by using a direct plug-in connection between the PCB and the lead wires of the actuator.

Accordingly, the present invention provides an actuator including a housing, an output driven by a gear train; a motor driving the output via the gear train; a PCB connected to the motor for supplying power to the motor; and lead wires connected to the PCB via a direct connection connector to supply power to the PCB and/or carry signals.

Preferably, the connection between the lead wires and the PCB is solder free.

Preferably, the PCB has contact pads and the connector has terminals which make a mechanical connection with the contact pads.

Preferably, the PCB has a cut-out arranged to receive the connector and align the terminals with the contact pads.

Preferably, the contact pads are arranged along one edge of the cut-out.

Preferably, the contact pads are arranged on both sides of the PCB.

Preferably, the PCB supports at least one actuator monitoring device and the lead wires include signal wires communicating with the monitoring device via the PCB.

Preferably, the actuator monitoring device includes a position sensor.

Preferably, each lead wire is connected to a respective one of the terminals and each terminal has a bifurcated distal end which straddles and grips the PCB to make electrical contact with the contact pads.

Preferably, the lead wires include power leads and signal leads.

Preferably, the lead wires include signal leads providing information about a state of the actuator.

Preferably, the lead wires include signal leads providing communication signals for operation of the actuator.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labelled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
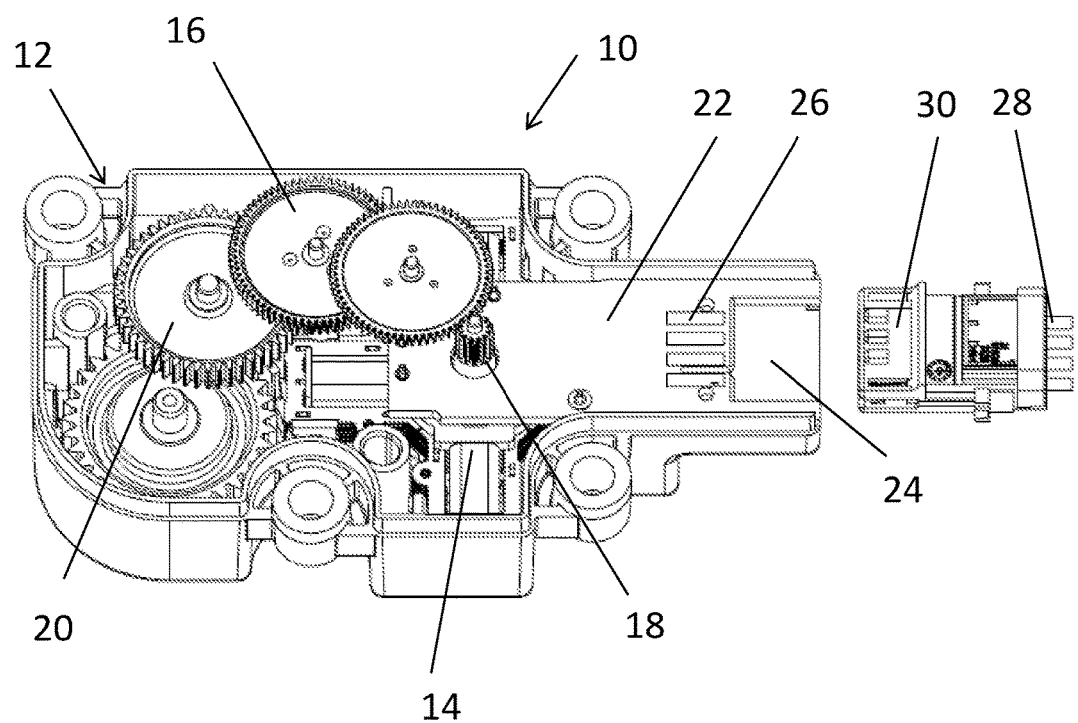
FIG. 1 is a schematic illustration of an actuator according to a preferred embodiment of the present invention, with a cover removed.

FIG. 1 is a schematic representation of an actuator 10 as used for adjusting the position of a flap in a vehicle air-conditioning unit. The actuator is shown with a top cover removed to show the inner workings of the actuator. The actuator has a housing 12, in this embodiment, a two part housing comprising a base and a cover (not shown) connected to the base by snap latches. The actuator has an output driven by an electric motor 14 via a gear train 16. A printed circuit board (PCB) 22 sits above the motor 14 and has a connector portion for connection to lead wires 28 and has electronics for determining the position of the output or other metrics of the actuator. The lead wires 28 include two power leads and two or three signal leads. The PCB 22 has a connection to the motor 14 to supply power from the power leads. As can be seen in FIG. 1, an input pinion 18 is fixed to a shaft of the motor and forms the first cog of the gear train 16. The last cog 20 of the gear train forms the output of the actuator. The last cog 20 has a projection, not shown, which extends through the actuator housing to engage the flap in a manner that is generally known.

The PCB 22 has a cut-out 24 arranged to receive a connector 30 fitted to the lead wires 28. Contact pads 26 are arranged on the PCB adjacent to the cut-out 24 for direct contact with terminals of the connector. The terminals are crimped to the ends of the respective wires and are arranged to make direct contact with respective contact pads when the connector 30 is fitted to the PCB. Preferably, the connector is arranged to grip the PCB to prevent accidental removal or disconnection. Preferable, each terminal has a bifurcated distal end and the PCB is inserted between the bifurcated ends to grip the PCB and to make direct contact with the connection pads. In this manner, contact pads may be formed on both sides of the PCB to increase the contact area between the contact pads and the terminals to increase the reliability of the electrical connection.

Figure 2:
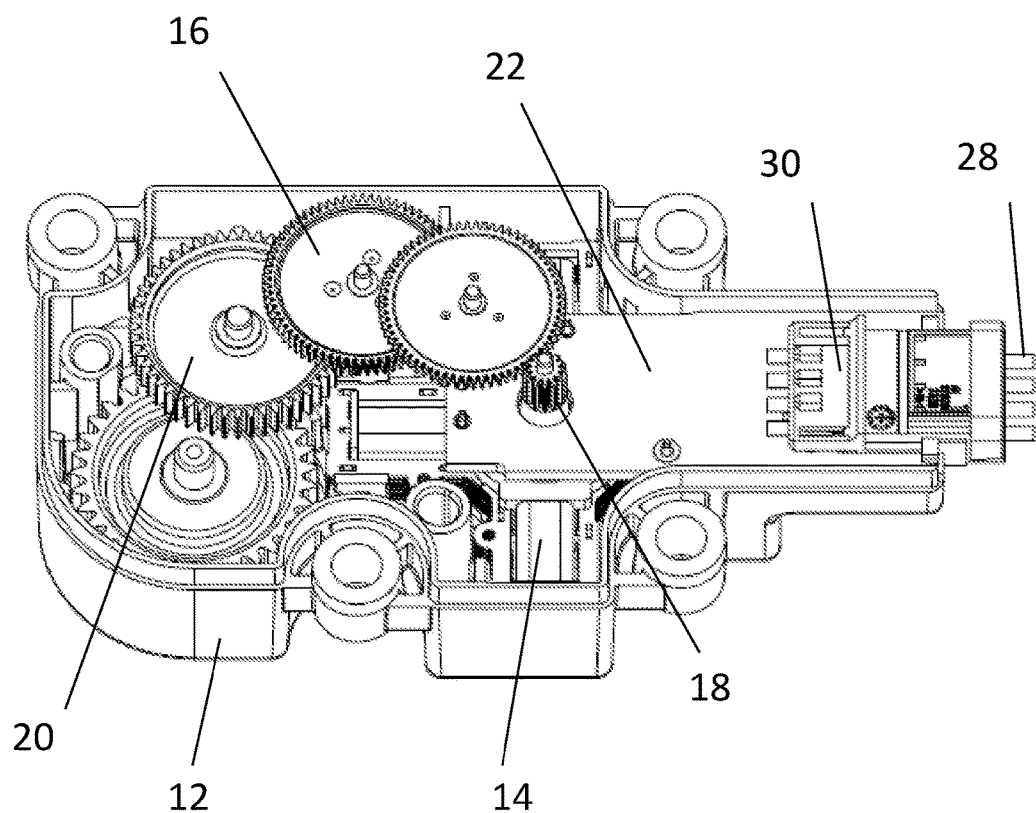
FIG. 2 illustrates the actuator of FIG. 1, with a cover removed, showing lead wires connected to a PCB.

In FIG. 1, the lead wires 28 with the connector 30 are shown ready to be 'plugged' into the PCB 22. In FIG. 2 the connector 30 is shown fitted to the PCB 22. While it is preferred that the PCB has a cut-out for receiving and locating the connector with respect to the PCB, other methods of alignment and retention may be used. For example, alternatively or in addition, the housing 12 may have projections arranged as detents to prevent accidental removal or disconnection of the connector and/or to align the connector with the PCB, so that the terminals make contact with the correct contact pads.

Figure 3:
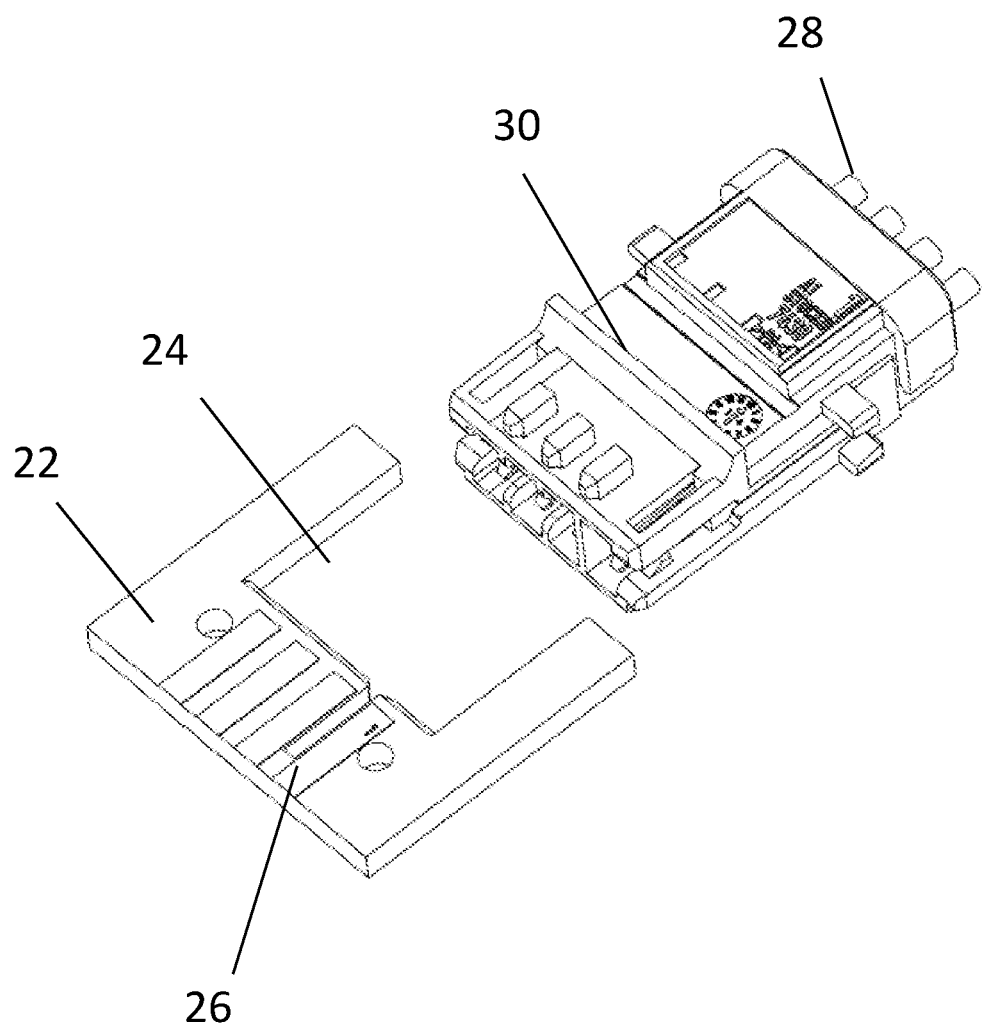
FIG. 3 illustrates a connector used in the actuator of FIG. 2, before connection to the PCB.
Figure 4:
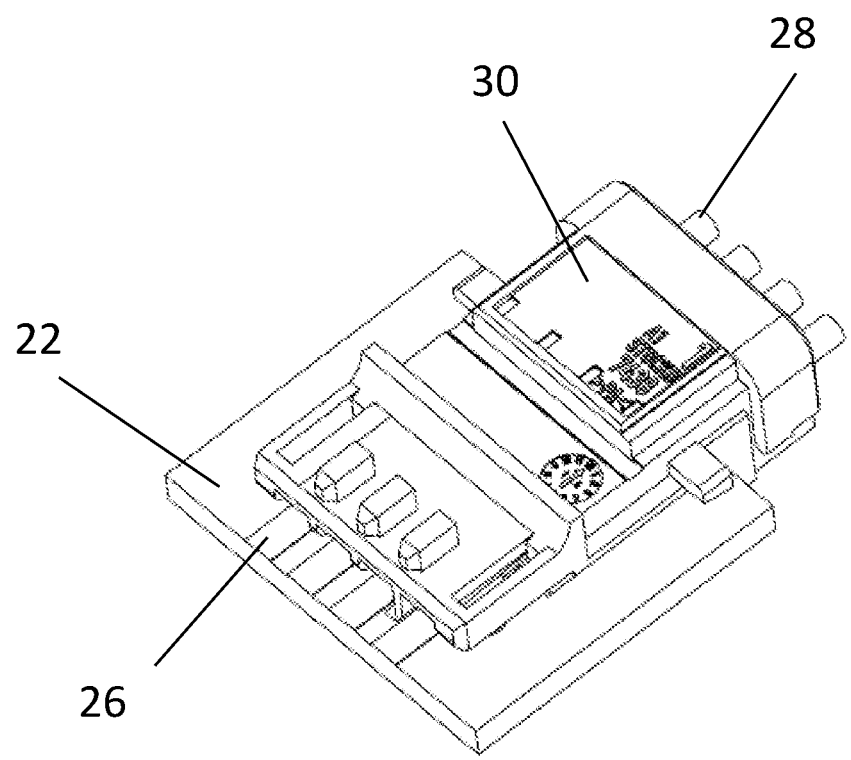
FIG. 4 is a schematic representation illustrating how the connector of FIG. 2 connects with the PCB.
Figure 5:
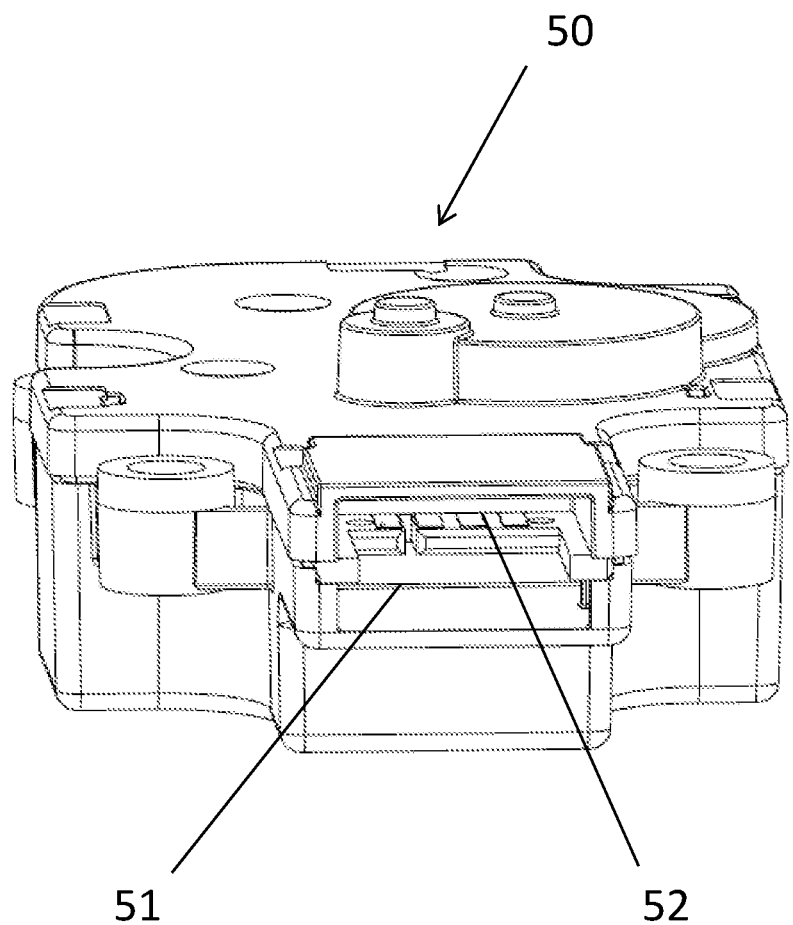
FIG. 5 illustrates a prior art actuator.

FIGS. 3 and 4 show the connection on an enlarged scale. In FIG. 3 a five wire connector 30 is shown aligned with the cut-out 24 in the PCB 22 in readiness for being plugged into the PCB. The sides of the connector are configured to engage with the edges of the cut-out 24 to correctly align the terminals with the contact pads 26. The connector may form a detent with the edges of the cut-out so as to not rely or rely solely on the contact pressure between the terminals and the contact pads. In FIG. 4, a four wire connector 30 is shown in the fitted position with the PCB 22. The number of lead wires used depends on the need of the actuator being used. Generally there will be two power leads and two or three signal leads, but other combinations are possible. For example, the lead wires may only contain two power leads and the actuator may not have any feedback or monitoring electronics or devices.

As shown, the connection between the lead wires and the PCB of the actuator is simplified by direct connection of the lead wire connector to the PCB, thus eliminating the connector socket and the soldering of the connector pins.

By eliminating the connector pins, the use of solder in the construction of the actuator is reduced and a major source of failure, problems with the solder joints between the connector pins and the PCB, is eliminated. Also by eliminating the connector socket, the cost of the actuator is reduced. As the housing no longer needs to cover the connector socket, the physical size and weight of the actuator can be reduced.

The terminals may be of the crimp type further reducing the amount of solder used in the construction of the actuator.

One example of a PCB direct connect connector is commercially available from Stocko Contact GmbH & Co., of Germany under their catalogue number Series MH 7438, with PCB locking.

The PCB direct connector clamps directly to the PCB and forms a direct electrical connection with contact pads of the PCB. Therefore the actuator does not need to have a separate connector socket to mate with the plug. Thus the invention avoids the use of pins soldered to the PCB and the connector socket, creating a cheaper actuator with a smaller footprint.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

For example, the lead wires may contain any number of power leads and/or signal leads according to application requirements and the signal leads may include leads providing communication signals and/or leads providing information about a metric or state of the actuator, commonly referred to as sensor signals.

The invention claimed is:

1. An actuator, comprising:
a housing;
an output driven by a gear train;
a motor driving the output via the gear train;
a PCB connected to the motor for supplying power to the motor; and
lead wires connected to the PCB via a direct connection connector to supply power to the PCB and/or carry signals,
wherein the connection between the lead wires and the PCB is solder free.

2. The actuator according to claim 1, wherein the PCB has contact pads and the connector has terminals which make a mechanical connection with the contact pads.

3. The actuator according to claim 2, wherein the PCB has a cut-out arranged to receive the connector and align the terminals with the contact pads.

4. The actuator according to claim 2, wherein the contact pads are arranged along one edge of a cut-out.

5. The actuator according to claim 4, wherein the contact pads are arranged on both sides of the PCB.

6. The actuator according to claim 2, wherein each lead wire is connected to a respective one of the terminals and each terminal has a bifurcated distal end which straddles and grips the PCB to make electrical contact with the contact pads.

7. The actuator according to claim 1, wherein the PCB supports at least one actuator monitoring device and the lead wires include signal wires communicating with the monitoring device via the PCB.

8. The actuator according to claim 7, wherein the actuator monitoring device includes a position sensor.

9. The actuator according to claim 1, wherein the lead wires include power leads and signal leads.

10. The actuator according to claim 1, wherein the lead wires include signal leads providing information about a state of the actuator.

11. The actuator according to claim 1, wherein the lead wires include signal leads providing communication signals for operation of the actuator.

* * * * *